(12) United States Patent
Kanno et al.

(10) Patent No.: US 8,807,760 B2
(45) Date of Patent: Aug. 19, 2014

(54) LIGHT SOURCE APPARATUS AND PROJECTOR TYPE IMAGE DISPLAY APPARATUS

(75) Inventors: Naoki Kanno, Tokyo (JP); Shigenori Shibue, Tokyo (JP); Takuya Kodama, Tokyo (JP); Shigetoshi Ipposhi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 306 days.

(21) Appl. No.: 12/986,238

(22) Filed: Jan. 7, 2011

(65) Prior Publication Data

US 2011/0181842 A1 Jul. 28, 2011

(30) Foreign Application Priority Data

Jan. 27, 2010 (JP) .................................. 2010-015045

(51) Int. Cl.
G03B 21/16 (2006.01)

(52) U.S. Cl.
USPC ................... 353/52; 353/57; 353/58; 353/60; 353/61; 353/31; 165/80.3; 165/104.33; 361/702

(58) Field of Classification Search
USPC ........... 353/30, 31, 52, 56, 57–58, 59, 60–61; 362/231, 249.02, 249.13, 555, 559; 361/690–692, 694, 695, 697, 702, 703; 165/80.3, 104.33, 185; 174/16.1, 16.3
See application file for complete search history.

(56) References Cited

U.S. PATENT DOCUMENTS

| 7,334,898 | B2 * | 2/2008 | Seto et al. .................... 353/61 |
| 7,578,595 | B2 * | 8/2009 | Miwa et al. .................. 353/54 |
| 7,733,649 | B2 * | 6/2010 | Anderl et al. ................ 361/695 |
| 7,914,152 | B2 * | 3/2011 | Li et al. ........................ 353/54 |
| 8,070,296 | B2 * | 12/2011 | Hiranuma et al. ............. 353/52 |
| 2002/0135741 | A1 * | 9/2002 | Lee et al. ..................... 353/61 |
| 2003/0218723 | A1 | 11/2003 | Yamanaka |
| 2005/0128441 | A1 * | 6/2005 | Morgan ...................... 353/102 |
| 2005/0134804 | A1 * | 6/2005 | Hashimoto .................. 353/31 |
| 2005/0201107 | A1 | 9/2005 | Seki |
| 2006/0060333 | A1 * | 3/2006 | Chordia et al. ........... 165/104.33 |
| 2006/0082732 | A1 | 4/2006 | Miwa et al. |
| 2006/0203206 | A1 | 9/2006 | Kim |
| 2007/0201235 | A1 | 8/2007 | Sawai et al. |
| 2009/0129018 | A1 * | 5/2009 | Zhou et al. .................. 361/697 |
| 2009/0244840 | A1 * | 10/2009 | Takawa et al. ............... 361/695 |

FOREIGN PATENT DOCUMENTS

| EP | 1548354 A2 | 6/2005 |
| EP | 1903387 A1 | 3/2008 |
| EP | 2124101 A1 | 11/2009 |
| JP | 2004-259841 A | 9/2004 |
| JP | 2004-362900 A | 12/2004 |

(Continued)

*Primary Examiner* — Georgia Y Epps
*Assistant Examiner* — Sultan Chowdhury
(74) *Attorney, Agent, or Firm* — Birch, Stewart, Kolasch & Birch, LLP.

(57) ABSTRACT

The present invention is directed to provide a light source apparatus that includes space-saving LED cooling unit, and a projector type image display apparatus including the same. The light source apparatus of the present invention includes a plurality of LEDs, a plurality of heatsinks that are respectively thermally coupled to the LEDs and that are disposed in series with an interval between each other, and a cooler mechanism that sends a cooling airflow into the heatsinks along their disposition direction. A heatsink included in the plurality of heatsinks that dissipates the heat of an LED having a greater heat generating amount out of the plurality of LEDs is disposed downstream in the cooling airflow from the other heatsink.

20 Claims, 4 Drawing Sheets

(56) References Cited

FOREIGN PATENT DOCUMENTS

| JP | 2005-316337 A | 11/2005 |
| JP | 2006-59607 A | 3/2006 |
| JP | 2006-084972 A | 3/2006 |
| JP | 2006-139245 A | 6/2006 |
| JP | 2006-253274 A | 9/2006 |
| JP | 2007-133300 | 5/2007 |
| JP | 2008-192940 A | 8/2008 |
| JP | 2009-080146 A * | 4/2009 |
| JP | 2009-80146 A | 4/2009 |

* cited by examiner

LIGHT SOURCE APPARATUS AND PROJECTOR TYPE IMAGE DISPLAY APPARATUS

BACKGROUND OF THE INVENTION

1. Field of the Invention

The present invention relates to a light source apparatus that uses LEDs as the light source and, in particular, to a light source apparatus that suppresses an increase in the temperature of the LEDs.

2. Description of the Background Art

Conventionally, a discharge lamp has been widely used as the light source of a projector type image display apparatus. In recent years, advances in the light-emitting diode (hereinafter referred to as LED) technology has brought about enhanced output brightness of the LEDs which is enough to serve as the light source of the projector type image display apparatus. Because brightness characteristics of the LEDs vary depending on the temperature of the LEDs, it is necessary to control the temperature so as to be equal to or lower than a proper temperature. An increase in the temperature of the LEDs to be equal to or higher than a prescribed value invites a reduction in brightness, and also a significant reduction in service life.

However, a heat generating amount of each LED light source varies depending on colors, and it is difficult to cool LEDs of different colors by an identical heatsink. Additionally, though a large-sized cooling structure in which heatsinks and fans are used is required to cool the LEDs, it is desirable to implement the cooling structure while saving space as much as possible, in consideration of a reduction in size of the apparatus.

In order to address such a problem, what are available in the conventional techniques are: the one that brings a plurality of LEDs into contact with a heatsink so as to uniformly cool the LEDs; the one that uses a Peltier element; and the one that conducts central cooling by having a heat pipe or the like perform heat transport. For example, Japanese Patent Application Laid-Open No. 2004-362900 discloses the one that evenly cools the LEDs, Japanese Patent Application Laid-Open Nos. 2008-192940 and 2006-253274 disclose the cooling unit using the Peltier element, and Japanese Patent Application Laid-Open Nos. 2006-059607, 2005-316337 and 2004-259841 disclose a module structure using the heatsink, fans, and the heat pipe.

While various structures as described above are available as means for cooling the LEDs, there are no light source apparatuses that determines the cooling order based on the difference in the upper limit temperature among the LED light sources, or light source apparatuses that have cooling unit structured to cool a plurality of heatsinks altogether for achieving a reduction in size.

SUMMARY OF THE INVENTION

The present invention is directed to provide a light source apparatus that includes space-saving LED cooling unit, and a projector type image display apparatus including the same.

A light source apparatus of the present invention includes a plurality of LEDs, a plurality of heatsinks, and a cooler mechanism. The plurality of heatsinks are respectively thermally coupled to the LEDs, and disposed in series with an interval between each another. The cooler mechanism sends a cooling airflow into the heatsinks in a disposition direction of the heatsinks. A heatsink included in the heatsinks that dissipates heat of an LED having a greater heat generating amount out of the plurality of LEDs is disposed downstream in the cooling airflow from the remainder of the plurality of heatsinks.

Because a single cooling airflow dissipates the heat of the plurality of LEDs, a space-saving structure is obtained, which contributes toward reducing the size of the light source apparatus.

A light source apparatus of the present invention includes an LED group constituted of a plurality of LEDs, a heatsink group, and a cooler mechanism. The heatsink group is constituted of a plurality of heatsinks that respectively thermally couple to the LEDs constituting the LED group and that dissipate heat of the LEDs constituting the LED group. The cooler mechanism introduces a cooling airflow into the heatsink group. The LED group and the heatsink group are divided into a plurality of rows and the remainder of the plurality of rows as being disposed with an interval from each other. The cooler mechanism introduces the cooling airflow into each row of the heatsink group along the row. The heatsink included in the heatsink group that dissipates the heat of the LED disposed as the remainder of the plurality of rows includes heat pipes. The heat pipes transport heat toward downstream in the cooling airflow in heatsinks included in the heatsink group that dissipate heat of the LEDs disposed in the plurality of rows.

Because a single cooling airflow dissipates the heat of the plurality of LEDs, a space-saving structure is obtained, which contributes toward reducing the size of the light source apparatus. Further, the heat pipes transporting the heat toward downstream in the cooling airflow in the heatsinks that dissipate the heat of the LEDs disposed in the plurality of rows achieves more efficient heat dissipation of the LEDs, which contributes toward reducing the size of the light source apparatus.

These and other objects, features, aspects and advantages of the present invention will become more apparent from the following detailed description of the present invention when taken in conjunction with the accompanying drawings.

Figure 1:
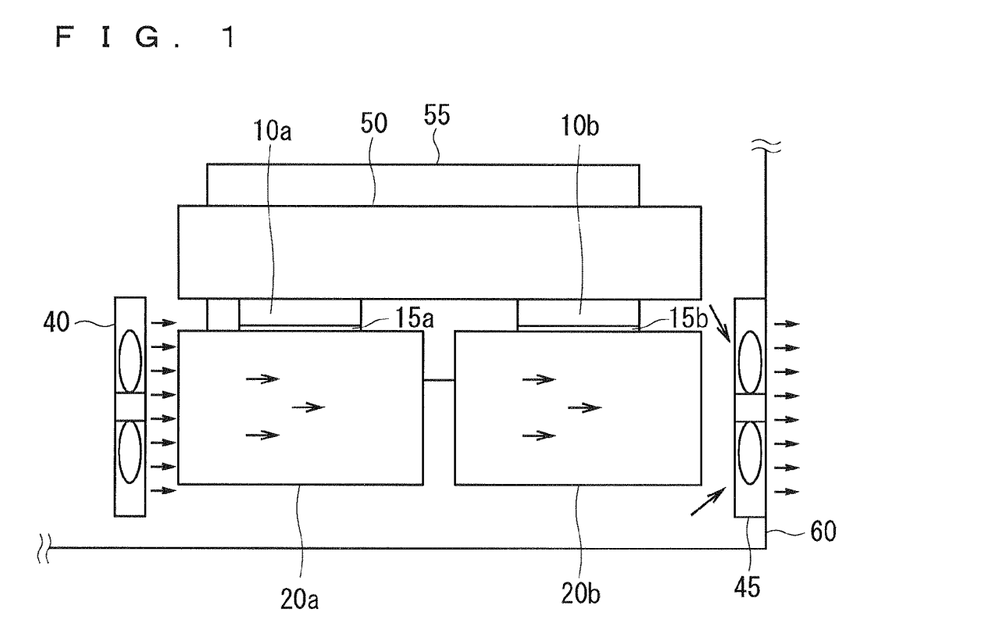
FIGS. 1 and 2 are configuration diagrams of a light source apparatus according to a first preferred embodiment.

DESCRIPTION OF THE PREFERRED EMBODIMENTS (First Preferred Embodiment)
<Structure>
FIG. 1 shows the structure of a light source apparatus according to a first preferred embodiment. This is used as a light source apparatus of a projector type image display apparatus, for example. The light source apparatus includes LEDs 10a and 10b as light sources, a housing 50 equipped with the LEDs 10a and 10b, and a movable stage 55 that fixes the housing 50. The movable stage 55 is capable of moving in parallel to each axis of X, Y and Z and capable of rotating about each axis of X, Y and Z. Adjustment of the movable stage 55 in this manner makes it possible to adjust the position of the LEDs 10a and 10b. To the LED 10a, a heatsink 20a is attached via a thermal conductor 15a such as a thermally conductive grease. The thermal conductor 15a serves to reduce the thermal contact resistance, and the LED 10a and the heatsink 20a are thermally coupled to each other. Similarly, to the LED Mb, a heatsink 20b is attached via a thermal conductor 15b, and the LED 10b and the heatsink 20b are thermally coupled to each other.

The light source apparatus further includes fans 40 and 45 that introduce a cooling airflow into the heatsinks 20a and 20b. Here, the heat generating amount of the LED 10b is greater than that of the LED 10a, and the temperature of the heatsink 20b becomes higher than that of the heatsink 20a. For this reason, the heatsink 20b is disposed downstream in the cooling airflow from the heatsink 20a. The fan 40 is fixed on the movable stage 55 by fixing unit (not shown) upstream from the heatsinks 20a and 20b, and the fan 45 is fixed to a cabinet GO downstream from the heatsinks 20a and 20b. The cooling airflow produced by the fan 40 cools the heatsinks 20a and 20b, and thereafter exhausted to the outside of the cabinet 60 from an opening part of the cabinet 60 by the fan 45. The fan 45 is attached near the opening part of the cabinet 60, so as to also serve to increase the flow rate of the air flowing through the heatsinks 20a and 20b (because the fan 45 is attached to the cabinet 60, the fan 45 and the opening part of the cabinet 60 are coaxially aligned). The cooling airflow is indicated by arrows in FIG. 1. It is to be noted that the cooling airflow established inside the cabinet 60 by the fans 40 and 45 is partially exhausted to the outside of the cabinet 60 without flowing through the heatsinks 20a and 20b. Next, the flow of heat generated by the LEDs is discussed. The heat generated by the LED 10a is transferred to the heatsink 20a, and the heat generated by the LED 10h is transferred to the heatsink 20b. By the fans 40 and 45, the cooling airflow is forcibly produced through the heatsinks 20a and 20b. The cooling airflow produced by the fans 40 and 45 firstly flows through the heatsink 20a disposed upstream to carry out heat exchange, thereby lowering the temperature of LED 10a. Though this heat exchange raises the temperature of the air having passed through the heatsink 20a, the temperature is still lower than the temperature of the heatsink 20b. This allows the air to again carry out heat exchange when passing through the heatsink 20b next, thereby lowering the temperature of the LED 10b.

Specifically, the light source apparatus according to the first preferred embodiment being the light source of a projector type image display apparatus or the like includes a plurality of LEDs 10a and 10h, a plurality of heatsinks 20a and 20b that are respectively thermally coupled to the LEDs 10a and lob and that are disposed in series with an interval between each other, and fans 40 and 45 (cooler mechanism) that send a cooling airflow into the heatsinks 20a and 20b in the disposition direction of the heatsinks 20a and 20b. The heatsink 20b that dissipates the heat of the LED 10b having a greater heat generating amount out of the plurality of LEDs 10a and 10b is disposed downstream in the cooling airflow from the other heatsink 20a.

Because a pair of fans 40 and 45 dissipates the heat of the plurality of LEDs 10a and 10b, a space-saving structure is obtained, which contributes toward reducing the size of the light source apparatus.

Figure 2:
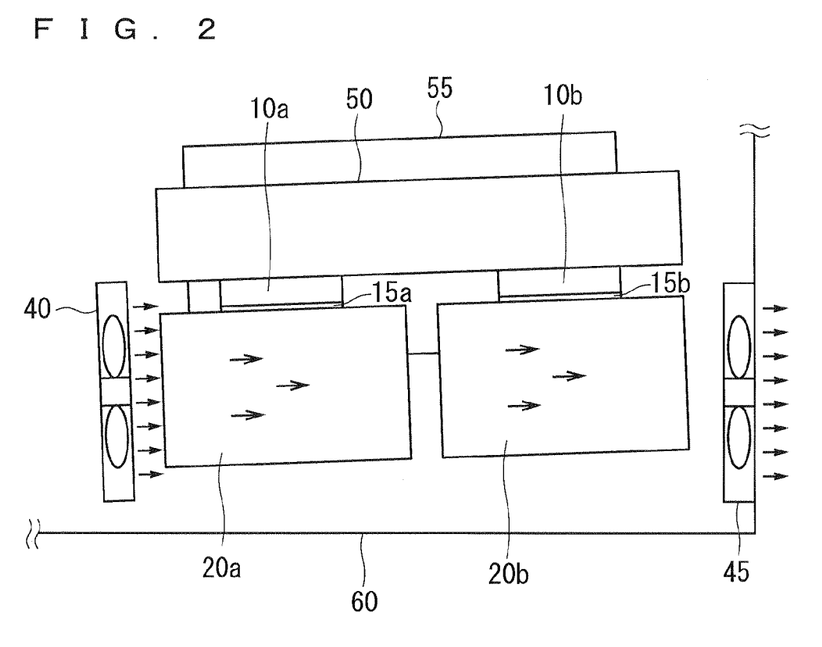
Figure 3:
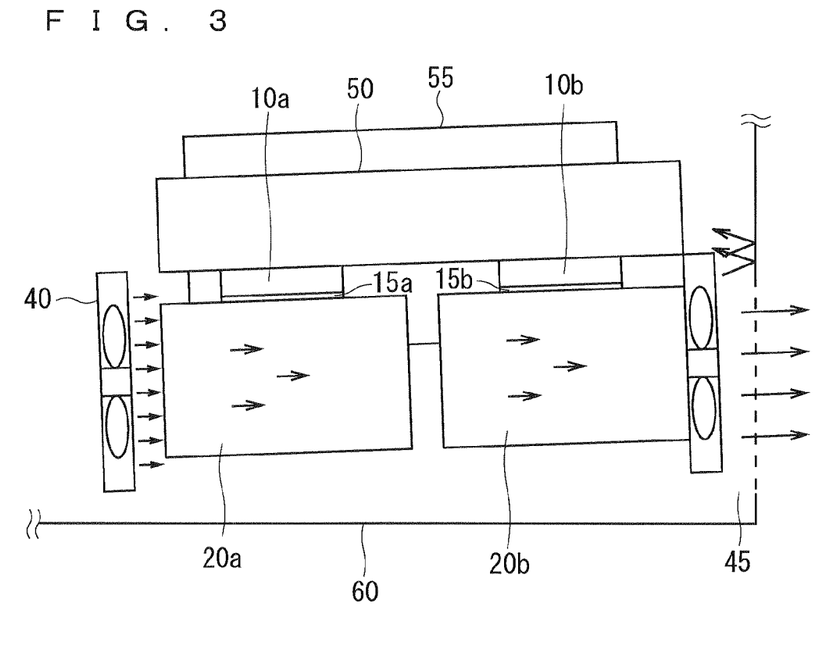
FIG. 3 is a configuration diagram of the light source apparatus in a case where fans are placed on a movable stage.

While FIG. 1 shows that the heatsinks 20a and 20b are accurately aligned with the fans 40 and 45, practically, the position of the LEDs 10a and 10b is adjusted by moving the movable stage 55. Therefore, as shown in FIG. 3, there are some cases where the heatsinks 20a and 20b do not align with the fan 45. As shown in FIG. 3, provided that the fan 45 is disposed on the movable stage 55, the shift of the movable stage 55 changes the position of the fan 45. This changes the direction of the cooling airflow, causing the cooling airflow to hit the wall of the cabinet 60 and to be reflected off, instead of passing through the opening part. Thus, the cooling airflow cannot be exhausted to the outside of the cabinet 60, whereby the temperature of the LEDs fails to stay within the upper limit. In contrast thereto, according to the first preferred embodiment, because the downstream fan 45 is fixed to the cabinet 60, even when the movable stage 55 is moved to adjust the orientation of the heatsinks 20a and 20b as shown in FIG. 2, the direction of the exhaust air is unchanged. Thus, the LEDs 10a and 10h can appropriately be cooled.

It is to be noted that the shape and position of the heatsink 20b is set such that the cooling airflow is brought into contact with the heatsink 20b even when the maximum shift range of the movable stage 55 is reached, in order for the cooling airflow to cool the heatsink 20b when the movable stage 55 is shifted.

Further, while the fan 40 is disposed upstream from the heatsinks 20a and 20b in FIG. 1, the present invention is not limited to such a disposition, and the fan 40 may be disposed between the heatsinks 20a and 20b.

Still further, while it has exemplarily shown in FIG. 1 that the two LEDs differing in heat generating amount are cooled, with three or more LEDs also, by disposing the heatsinks in series in ascending order of the heat generating amounts of respective corresponding LEDs, the LEDs can be cooled by a pair of fans 40 and 45.

<Variation>

Figure 4:
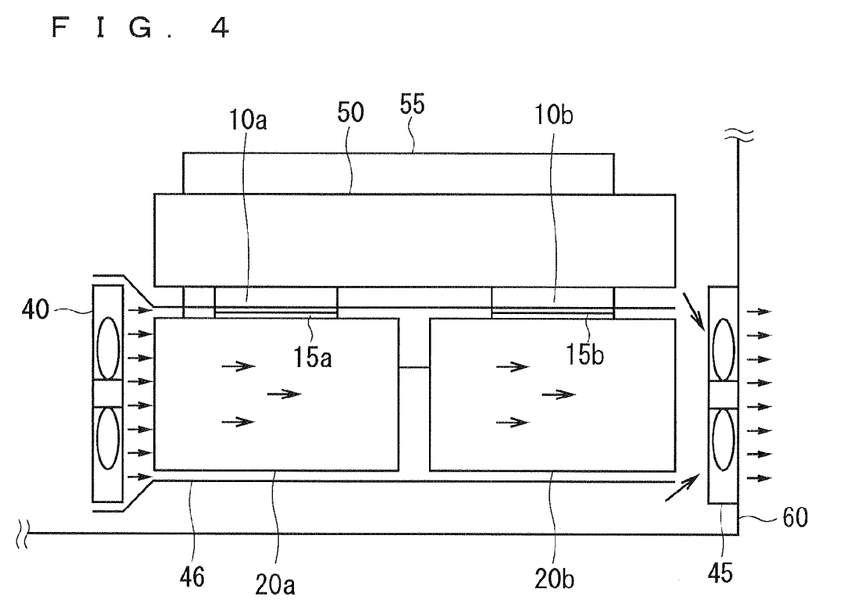
FIG. 4 is a configuration diagram of the light source apparatus according to the first preferred embodiment.

FIG. 4 shows a variation of the light source apparatus according to the first preferred embodiment. A light source apparatus shown in FIG. 4 includes, in addition to the structure shown in FIG. 1, a duct 46 that surrounds the heatsinks 20a and 20b and that opens toward the fans 40 and 45. As the wind produced by the fan 40 is entirely taken into the heatsinks by the duct 46, the heat dissipation of the LEDs 10a and 10b can be carried out more efficiently.

<Effect>

The light source apparatus of the first preferred embodiment provides the following effect. That is, the light source apparatus according to the first preferred embodiment includes a plurality of LEDs 10a and 10b, a plurality of heatsinks 20a and 20b that are respectively thermally coupled to the LEDs 10a and 10b, and that are disposed in series with an interval between each other, and fans 40 and 45 (cooler mechanism) that send a cooling airflow into the heatsinks 20a and 20b in the disposition direction of the heatsinks 20a and 20b. The heatsink 20b that dissipates the heat of the LED 10b having a greater heat generating amount out of the plurality of LEDs is disposed downstream in the cooling airflow from the other heatsink 20a. Because a pair of fans 40 and 45 dissipates the heat of the plurality of LEDs, a space-saving structure is obtained, which contributes toward reducing the size of the light source apparatus.

Further, the light source apparatus further includes a cabinet 60 that covers the heatsinks 20a and 20b and the cooler mechanism. The cooler mechanism includes an upstream fan 40 whose position is fixed relative to the heatsinks, and a downstream fan 45 fixed to the cabinet 60. Thus, even in a case where the movable stage 55 is moved to adjust the orientation of the heatsinks 20a and 20b, the direction of the exhaust air is unchanged, and the LEDs 10a and 10b can appropriately be cooled.

Still further, the light source apparatus includes a duct 46 that covers the heatsinks and that opens toward the fans 40 and 45. This makes it possible to cool the heatsinks 20a and 20b and to dissipate the heat of the LEDs 10a and 10b more efficiently.

Still further, a projector type image display apparatus according to the first preferred embodiment includes the light source apparatus described above. Because the cooling of the light source apparatus is carried out with a space-saving structure, it becomes possible to reduce the projector type image display apparatus in size.

(Second Preferred Embodiment)
<Structure>

Figure 5:
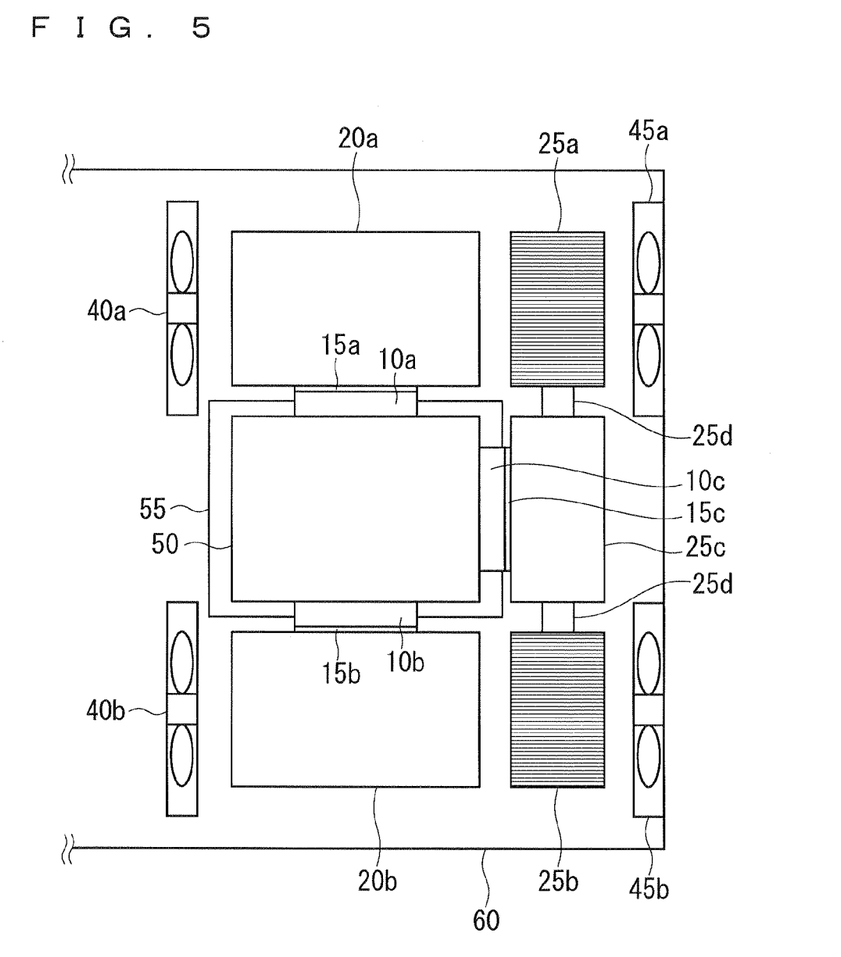
FIG. 5 is a configuration diagram of a light source apparatus according to a second preferred embodiment.

FIG. 5 shows the structure of a light source apparatus according to a second preferred embodiment. The light source apparatus according to the second preferred embodiment used for a projector type image display apparatus or the like is configured to cool three LEDs by two serially disposed cooling structures. The light source apparatus according to the second preferred embodiment includes a movable stage 55, a housing 50 disposed on the movable stage 55, and LEDs 10a, 10b and 10c respectively mounted to three sides of the housing 50. The movable stage 55 is capable of moving in parallel to each axis of X, Y and Z and capable of rotating about each axis of X, Y and Z. Adjustment of the movable stage 55 in this manner makes it possible to adjust the position of the LEDs 10a, 10b and 10c. To the LED 10a, a heatsink 20a is attached via a thermal conductor 15a such as a thermally conductive grease. The thermal conductor 15a serves to reduce the thermal contact resistance, and the LED 10a and the heatsink 20a are thermally coupled to each other. Similarly, to the LED 10b, a heatsink 20b is attached via a thermal conductor 15b, and the LED 10b and the heatsink 20b are thermally coupled to each other.

A heatsink 25 of the LED 10c includes a heat receiver 25c attached to the LED 10c via a thermal conductor 15c, a heat dissipating fin 25a disposed downstream from the heatsink 20a, a heat dissipating fin 25b disposed downstream from the heatsink 20b, and heat pipes 25d that transfer the heat of the heat receiver 25c to the heat dissipating fin 25a and the heat dissipating fin 25b. These constituents of the heatsink 25 are all thermally coupled to the LED 10c. The heatsink 20a and the heat dissipating fin 25a are a series of targets to be cooled, and are cooled by the fans 40a and 45a. Similarly, the heatsink 20b and the heat dissipating fin 25b are a series of targets to be cooled, and are cooled by the fans 40b and 45b. It is to be noted that the LED 10c is greater in heat generating amount than the LEDs 10a and 10b. The fans 40a and 40b are fixed on the movable stage 55 by fixing unit (not shown), and the fans 45a and 45b are fixed to the cabinet 60.

The heat transferred from the LED 10c to the heat receiver 25c of the heatsink 25 is transferred to the heat dissipating fins 25a and 25b by the heat pipes 25d.

The heat transferred from the LED 10a to the heatsink 20a undergoes heat exchange at the heatsink 20a by the cooling airflow produced by the fans 40a and 45b. The cooling airflow having passed through the heatsink 20a moves on to the heat dissipating fin 25a, where the cooling airflow undergoes further heat exchange. Though the temperature of the airflow having cooled the heatsink 20a rises, the LED 10c is greater than the LED 10a in heat generating amount, and the temperature of the heat dissipating fin 25a is higher than that of the heatsink 20a. Therefore, the airflow having cooled the heatsink 20a can further cool the heat dissipating fin 25a.

Similarly, the heat transferred from the LED 10b to the heatsink 20b undergoes heat exchange at the heatsink 20b by the cooling airflow produced by the fans 40b and 45b. The cooling airflow having passed through the heatsink 20b moves on to the heat dissipating fin 25b, where the cooling airflow undergoes further heat exchange. Though the temperature of the airflow having cooled the heatsink 20b rises, the LED 10c is greater than the LED 10b in heat generating amount, and the temperature of the heat dissipating fin 25b is higher than that of the heatsink 20b. Therefore, the airflow having cooled the heatsink 20b can further cool the heat dissipating fin 25b.

Specifically, the light source apparatus according to the second preferred embodiment includes an LED group constituted of a plurality of LEDs 10a, 10b and 10c, a heatsink group constituted of a plurality of heatsinks that respectively thermally couple to the LEDs 10a, 10b and 10c constituting the LED group and that respectively dissipate heat of the LEDs constituting the LED group, and fans 40a, 45a, 40b, and 45b (cooler mechanism) that introduce the cooling airflow into the heatsink group. The LED group and the heatsink group are divided into a plurality of rows and the remainder of the plurality of rows as being disposed with an interval from each other. The cooler mechanism introduces the cooling airflow into each row of the heatsink group along the row. The heatsink that dissipates the heat of the LED 10c disposed as the remainder of the plurality of rows includes the heat pipes 25d. The heat pipes 25d transport the heat toward downstream in the cooling airflow in the heatsinks 20a and 20b dissipating the heat of the LEDs 10a and 10b disposed in the plurality of rows. Thus, by cooling a plurality of heatsinks altogether based on the difference among the LEDs in heat generating amount, a reduction in size of the cooling structure can be achieved, and hence a reduction in size of the light source apparatus can be achieved.

Further, while the fans 40a and 40b are respectively disposed upstream from the heatsinks 20a and 20b in FIG. 5, the fans 40a and 40b may be disposed between the heatsinks 20a and 20b and the heatsink 25.

Still further, while FIG. 5 shows that the two LEDs 10a and 10b are disposed in parallel to each other and the LED 10c is disposed downstream therefrom, in a case where the number of the LEDs is greater than in this case, the additional LEDs may be added upstream or downstream from the LED 10a, or upstream or downstream from the LED 10b. It goes without saying that the LEDs having smaller heat generating amounts are to be disposed upstream. With such a disposition, four or greater LEDs can be cooled by two sets of the fans 40a and 45a, and 40b and 45b.

Still further, similarly to the variation of the first preferred embodiment, a duct that surrounds the heatsink 20a and that opens toward the fans 40a and 45a may be provided. Similarly, a duct that surrounds the heatsink 20b and that opens toward the fans 40b and 45b may be provided. This makes it possible to efficiently cool the LEDs using the cooling airflow produced by the fans 40a and 45a and the fans 40b and 45b.

<Effect>

As has been described, the light source apparatus according to the second preferred embodiment provides the following effect. That is, the light source apparatus according to the second preferred embodiment includes an LED group constituted of a plurality of LEDs 10a, 10b and 10c, a heatsink group constituted of a plurality of heatsinks that respectively thermally couple to the LEDs 10a, 10b and 10c constituting the LED group and that respectively dissipate heat of the LEDs 10a, 10b and 10c constituting the LED group, and fans 40a, 45a, 40b, and 45b (cooler mechanism) that introduce the cooling airflow into the heatsink group. The LED group and the heatsink group are divided into a plurality of rows and the remainder of the plurality of rows as being disposed with an interval from each other. The cooler mechanism introduces the cooling airflow into each row of the heatsink group along the row. The heatsink that dissipates the heat of the LED 10c disposed as the remainder of the plurality of rows includes the heat pipes 25d. The heat pipes 25d transport the heat toward downstream in the cooling airflow in the heatsinks 20a and 20b dissipating the heat of the LEDs 10a and 10b disposed in the plurality of rows. Thus, by cooling a plurality of heatsinks altogether based on the difference among the LEDs in heat generating amount, a reduction in size of the cooling structure can be achieved, and hence a reduction in size of the light source apparatus can be achieved.

While the invention has been shown and described in detail, the foregoing description is in all aspects illustrative and not restrictive. It is therefore understood that numerous modifications and variations can be devised without departing from the scope of the invention.

What is claimed is:

1. A light source apparatus, comprising:
   a plurality of LEDs;
   a plurality of heatsinks that are respectively thermally coupled to said LEDs, wherein all of said plurality of heatsinks are disposed in series in a single direction with an interval between each other; and
   a cooler mechanism that sends a cooling airflow into said heatsinks in said single direction of said heatsinks, wherein
   a heatsink included in said plurality of heatsinks that dissipates heat of an LED having a greater heat generating amount out of said plurality of LEDs is disposed downstream in said cooling airflow from the remainder of said plurality of heatsinks.

2. The light source apparatus according to claim 1, further comprising:
   a cabinet that covers said heatsinks and said cooler mechanism, wherein
   said cooler mechanism includes an upstream fan whose position is fixed relative to said heatsinks, and a downstream fan fixed to said cabinet.

3. The light source apparatus according to claim 2, further comprising:
   a duct that covers said heatsinks and that opens toward said fans.

4. A light source apparatus, comprising:
   an LED group constituted of a plurality of LEDs;
   a heatsink group constituted of a plurality of heatsinks that respectively thermally couple to the LEDs constituting said LED group and that dissipate heat of the LEDs constituting said LED group; and
   a cooler mechanism that introduces a cooling airflow into said heatsink group, wherein
   said LED group and said heatsink group are divided into a plurality of rows and the remainder of the plurality of rows as being disposed with an interval from each other,
   said cooler mechanism introduces the cooling airflow into each row of said heatsink group along the row,
   a heatsink included in said heatsink group that dissipates heat of said LED disposed as the remainder of the plurality of rows includes heat pipes, and
   said heat pipes transport heat toward downstream in said cooling airflow in heatsinks included in said heatsink group that dissipate heat of said LEDs disposed in the plurality of rows.

5. A projector type image display apparatus comprising a light source apparatus, said light source apparatus including:
   a plurality of LEDs;
   a plurality of heatsinks that are respectively thermally coupled to said LEDs, wherein all of said plurality of heatsinks are disposed in series in a single direction with an interval between each other; and
   a cooler mechanism that sends a cooling airflow into said heatsinks in said single direction of said heatsinks, wherein
   a heatsink included in said plurality of heatsinks that dissipates heat of an LED having a greater heat generating amount out of said plurality of LEDs is disposed downstream in said cooling airflow from the remainder of said plurality of heatsinks.

6. A projector type image display apparatus comprising a light source apparatus, said light source apparatus including:
   an LED group constituted of a plurality of LEDs;
   a heatsink group constituted of a plurality of heatsinks that respectively thermally couple to the LEDs constituting said LED group and that dissipate heat of the LEDs constituting said LED group; and
   a cooler mechanism that introduces a cooling airflow into said heatsink group, wherein
   said LED group and said heatsink group are divided into a plurality of rows and the remainder of the plurality of rows as being disposed with an interval from each other,
   said cooler mechanism introduces the cooling airflow into each row of said heatsink group along the row,
   a heatsink included in said heatsink group that dissipates heat of said LED disposed as the remainder of the plurality of rows includes heat pipes, and
   said heat pipes transport heat toward downstream in said cooling airflow in heatsinks included in said heatsink group that dissipate heat of said LEDs disposed in the plurality of rows.

7. The light source apparatus according to claim 2, wherein an opening part of said cabinet is coaxially aligned with said downstream fan.

8. The light source apparatus according to claim 7, further comprising: a plurality of heat dissipating fins disposed downstream in said cooling airflow from respective heatsinks.

9. The light source apparatus according to claim 4, further comprising:
   a cabinet that covers said heatsinks and said cooler mechanism, wherein
   said cooler mechanism includes an upstream fan whose position is fixed relative to said heatsinks, and a downstream fan fixed to said cabinet.

10. The light source apparatus according to claim 9, further comprising:
    a duct that covers said heatsinks and that opens toward said fans.

11. The light source apparatus according to claim 9, wherein an opening part of said cabinet is coaxially aligned with said downstream fan.

12. The light source apparatus according to claim 4, further comprising: a plurality of heat dissipating fins disposed downstream in said cooling airflow from respective heatsinks.

13. The projector type image display apparatus according to claim 5, wherein light source apparatus further comprising:
    a cabinet that covers said heatsinks and said cooler mechanism, wherein
    said cooler mechanism includes an upstream fan whose position is fixed relative to said heatsinks, and a downstream fan fixed to said cabinet.

14. The projector type image display apparatus according to claim 13, wherein light source apparatus further comprising:

a duct that covers said heatsinks and that opens toward said fans.

15. The light source apparatus according to claim 13, wherein an opening part of said cabinet is coaxially aligned with said downstream fan.

16. The light source apparatus according to claim 5, further comprising: a plurality of heat dissipating fins disposed downstream in said cooling airflow from respective heatsinks.

17. The projector type image display apparatus according to claim 6, wherein light source apparatus further comprising:
   a cabinet that covers said heatsinks and said cooler mechanism, wherein
   said cooler mechanism includes an upstream fan whose position is fixed relative to said heatsinks, and a downstream fan fixed to said cabinet.

18. The projector type image display apparatus according to claim 17, wherein light source apparatus further comprising:
   a duct that covers said heatsinks and that opens toward said fans.

19. The light source apparatus according to claim 17, wherein an opening part of said cabinet is coaxially aligned with said downstream fan.

20. The light source apparatus according to claim 6, further comprising: a plurality of heat dissipating fins disposed downstream in said cooling airflow from respective heatsinks.

* * * * *